US008935906B2

(12) United States Patent
Pape

(10) Patent No.: US 8,935,906 B2
(45) Date of Patent: Jan. 20, 2015

(54) METHOD AND APPARATUS FOR DISTRIBUTING ARTICLES IN A STORAGE COMPARTMENT

(75) Inventor: Henrik Pape, Horsens (DK)

(73) Assignee: Schur International A/S, Horsens (DK)

( * ) Notice: Subject to any disclaimer, the term of this patent is extended or adjusted under 35 U.S.C. 154(b) by 617 days.

(21) Appl. No.: 12/578,482

(22) Filed: Oct. 13, 2009

(65) Prior Publication Data

US 2010/0263335 A1 Oct. 21, 2010

(30) Foreign Application Priority Data

Apr. 21, 2009 (DK) ................ 2009 00512

(51) Int. Cl.
*B65B 3/04* (2006.01)
*B65B 57/00* (2006.01)
*B65G 69/04* (2006.01)
*B65G 1/04* (2006.01)

(52) U.S. Cl.
CPC .............. *B65G 69/0408* (2013.01); *B65G 1/04* (2013.01)
USPC .................... 53/473; 53/446; 53/493; 53/503; 53/244

(58) Field of Classification Search
USPC ............. 53/440, 448, 473, 58, 493–495, 503, 53/260, 235, 244, 446
See application file for complete search history.

(56) References Cited

U.S. PATENT DOCUMENTS

| 2,116,300 A | 5/1938 | Campos |
| 2,272,530 A | 2/1942 | Patterson |
| 2,322,175 A | 6/1943 | Talbot et al. |
| 2,334,256 A | 11/1943 | Eaton |
| 2,582,381 A | 1/1952 | Higginbottom |
| 2,584,726 A | 2/1952 | McOmber |
| 2,649,235 A | 8/1953 | Edmonds |
| 2,669,377 A | 2/1954 | Poolen et al. |
| 2,777,264 A | 1/1957 | Schenk |

(Continued)

FOREIGN PATENT DOCUMENTS

| CN | 2150499 Y | 12/1993 |
| EP | 0459050 | 12/1991 |

(Continued)

OTHER PUBLICATIONS

International Search Report from PCT/DK2008/000027, Apr. 3, 2008.

(Continued)

*Primary Examiner* — Gloria R Weeks
(74) *Attorney, Agent, or Firm* — Procopio, Cory, Hargreaves & Savitch LLP

(57) ABSTRACT

A system for distributing articles into an internal compartment of a storage unit has a longitudinally displaceable support or platform above the compartment which is movable longitudinally between a plurality of spaced discharge areas over corresponding storage positions. The support has at least one free edge, and is moved until an article carried on the support is displaced by a pusher moved into the path of the article and pushed over the edge to drop into the selected storage position. In one example, the support has opposite free edges and articles are selectively pushed over the edges into different storage positions. The process is repeated to dispense articles into different storage positions for uniform filling, and to control movement of the support and deployment of the pusher so that articles are dispensed into the storage positions with available space.

20 Claims, 16 Drawing Sheets

(56) References Cited

U.S. PATENT DOCUMENTS

| | | | |
|---|---|---|---|
| 2,986,897 A | 6/1961 | Howard | |
| 3,119,518 A | 1/1964 | Eschenburg et al. | |
| 3,151,668 A | 10/1964 | Zimmerman | |
| 3,211,338 A | 10/1965 | Weil et al. | |
| 3,277,666 A | 10/1966 | Simmons | |
| 3,323,280 A | 6/1967 | Rausch | |
| 3,380,222 A | 4/1968 | Bergmann et al. | |
| 3,416,620 A | 12/1968 | McClusky | |
| 3,488,910 A | 1/1970 | Stoger et al. | |
| 3,498,020 A | 3/1970 | Eppenberger | |
| 3,501,887 A | 3/1970 | Umholtz et al. | |
| 3,559,424 A | 2/1971 | Nelson | |
| 3,608,657 A | 9/1971 | Johnson et al. | |
| 3,608,786 A | 9/1971 | Shelley et al. | |
| 3,610,482 A | 10/1971 | Van Steenburgh | |
| 3,618,733 A | 11/1971 | Winsett | |
| 3,626,662 A | 12/1971 | Graveley | |
| 3,654,771 A | 4/1972 | Kuebler | |
| 3,688,471 A | 9/1972 | Clark | |
| 3,698,451 A | 10/1972 | Hudson | |
| 3,712,019 A | 1/1973 | Lamka | |
| 3,715,119 A | 2/1973 | Shelley et al. | |
| 3,719,307 A | 3/1973 | Larson | |
| 3,788,566 A | 1/1974 | Morris, Jr. | |
| 3,789,570 A | 2/1974 | Mullins, Jr. | |
| 3,789,574 A | 2/1974 | Weikert | |
| 3,807,193 A | 4/1974 | McKenney et al. | |
| 3,822,866 A | 7/1974 | Daester | |
| 3,830,266 A | 8/1974 | Hudson | |
| 3,897,676 A | 8/1975 | Membrino | |
| 3,903,674 A | 9/1975 | Brush et al. | |
| 3,913,343 A | 10/1975 | Rowland et al. | |
| 3,918,266 A | 11/1975 | Gindy et al. | |
| 3,969,909 A | 7/1976 | Barto et al. | |
| 3,974,625 A | 8/1976 | Simmons | |
| 3,977,851 A | 8/1976 | Toya | |
| 3,982,377 A | 9/1976 | Vanderpool | |
| 4,013,199 A | 3/1977 | Brown | |
| 4,027,459 A * | 6/1977 | Nieskens et al. | 53/500 |
| 4,056,215 A | 11/1977 | Zwahlen | |
| 4,074,507 A | 2/1978 | Ruf et al. | |
| 4,088,243 A | 5/1978 | Deveson | |
| 4,129,015 A | 12/1978 | Morris, Jr. | |
| 4,132,049 A | 1/1979 | Mullins, Jr. | |
| 4,136,803 A | 1/1979 | Tobias et al. | |
| 4,137,689 A | 2/1979 | McClusky et al. | |
| 4,139,029 A | 2/1979 | Geraci | |
| 4,139,126 A | 2/1979 | Krasner | |
| 4,158,426 A | 6/1979 | Frohbieter | |
| 4,189,063 A | 2/1980 | Matthieson | |
| 4,252,002 A | 2/1981 | Mullins, Jr. | |
| 4,276,751 A | 7/1981 | Saltzman et al. | |
| 4,320,615 A | 3/1982 | Gmuer | |
| 4,348,872 A | 9/1982 | Hill | |
| 4,350,004 A | 9/1982 | Tsujimoto et al. | |
| 4,368,608 A | 1/1983 | Ray | |
| 4,404,817 A | 9/1983 | Cox | |
| 4,409,763 A | 10/1983 | Rydeen | |
| 4,420,197 A | 12/1983 | Dreiling | |
| 4,461,520 A | 7/1984 | Alneng | |
| 4,467,622 A | 8/1984 | Takahashi et al. | |
| 4,478,386 A | 10/1984 | Mikkelsen | |
| 4,487,093 A | 12/1984 | Peroutky | |
| 4,522,292 A | 6/1985 | Euverard | |
| 4,527,401 A | 7/1985 | Nelson | |
| 4,534,155 A | 8/1985 | Sawa et al. | |
| 4,587,810 A | 5/1986 | Fletcher | |
| 4,598,529 A | 7/1986 | Pongrass et al. | |
| 4,612,779 A | 9/1986 | Hatton | |
| 4,673,103 A | 6/1987 | Anderson et al. | |
| 4,689,937 A | 9/1987 | Finan, Sr. et al. | |
| 4,715,167 A | 12/1987 | Savigny | |
| 4,732,301 A | 3/1988 | Tobias | |
| 4,803,847 A | 2/1989 | Koeneman et al. | |
| 4,850,202 A | 7/1989 | Kito et al. | |
| 4,878,523 A | 11/1989 | Balsamico et al. | |
| 4,903,494 A | 2/1990 | Wigley | |
| 4,909,696 A | 3/1990 | Wigley | |
| 4,930,685 A | 6/1990 | Landers | |
| 4,942,979 A | 7/1990 | Linstromberg et al. | |
| 4,942,983 A | 7/1990 | Bradbury | |
| 4,979,353 A * | 12/1990 | Seppala | 53/449 |
| 4,981,237 A | 1/1991 | Landers | |
| 4,995,219 A | 2/1991 | Hicks | |
| 5,005,341 A | 4/1991 | Tetenborg | |
| 5,009,060 A | 4/1991 | Furukawa | |
| 5,027,610 A | 7/1991 | Hara | |
| 5,056,299 A | 10/1991 | Furukawa | |
| 5,070,798 A | 12/1991 | Jurgens | |
| 5,079,897 A | 1/1992 | Muller | |
| 5,088,300 A | 2/1992 | Wessa | |
| 5,108,590 A | 4/1992 | DiSanto | |
| 5,109,651 A | 5/1992 | Stuart | |
| 5,112,477 A | 5/1992 | Hamlin | |
| 5,211,030 A | 5/1993 | Jameson | |
| 5,277,016 A | 1/1994 | Williams et al. | |
| RE34,533 E | 2/1994 | Wigley | |
| 5,440,863 A | 8/1995 | Toya et al. | |
| 5,473,865 A | 12/1995 | Tanaka et al. | |
| 5,630,310 A | 5/1997 | Chadwell | |
| 5,722,215 A | 3/1998 | Yuyama | |
| 5,791,123 A | 8/1998 | Bolz | |
| 5,813,196 A * | 9/1998 | Page et al. | 53/448 |
| 5,822,955 A | 10/1998 | Woosley et al. | |
| 5,832,700 A | 11/1998 | Kammler et al. | |
| 6,112,539 A | 9/2000 | Colberg | |
| 6,237,308 B1 | 5/2001 | Quintin et al. | |
| 6,282,869 B1 | 9/2001 | Bullock et al. | |
| 6,305,177 B1 | 10/2001 | Edwards et al. | |
| 6,474,048 B1 | 11/2002 | Metzger et al. | |
| 6,725,625 B1 | 4/2004 | Honma et al. | |
| 6,862,866 B2 | 3/2005 | Jacobsen et al. | |
| 6,904,765 B2 | 6/2005 | Lee et al. | |
| 6,904,946 B2 | 6/2005 | James | |
| 7,062,892 B2 | 6/2006 | Metzger | |
| 7,331,163 B2 | 2/2008 | Hau et al. | |
| 7,421,834 B1 | 9/2008 | Doolan | |
| 7,426,812 B2 | 9/2008 | Metzger | |
| 7,426,945 B2 | 9/2008 | Dalton et al. | |
| 7,669,434 B2 | 3/2010 | Leclear et al. | |
| 7,681,408 B2 | 3/2010 | Hobson et al. | |
| 7,849,660 B2 | 12/2010 | Metzger | |
| 7,958,918 B2 | 6/2011 | Ladson | |
| 7,992,364 B2 | 8/2011 | Thurgood et al. | |
| 8,122,689 B2 * | 2/2012 | Pape | 53/440 |
| 8,299,656 B2 | 10/2012 | Allard et al. | |
| 8,336,975 B2 | 12/2012 | Allard et al. | |
| 8,438,870 B2 | 5/2013 | Leclear et al. | |
| 2003/0000180 A1 | 1/2003 | Singer | |
| 2004/0216481 A1 | 11/2004 | James et al. | |
| 2005/0115210 A1 | 6/2005 | Noumi | |
| 2006/0021300 A1 | 2/2006 | Tada et al. | |
| 2006/0090427 A1 | 5/2006 | Hau et al. | |
| 2008/0047233 A1 | 2/2008 | Metzger | |
| 2008/0110129 A1 | 5/2008 | LeBlanc et al. | |
| 2008/0283145 A1 | 11/2008 | Maxwell | |
| 2008/0295462 A1 | 12/2008 | Metzger | |
| 2010/0011710 A1 | 1/2010 | Pape | |
| 2010/0024363 A1 | 2/2010 | Pape | |
| 2010/0313524 A1 | 12/2010 | Pape et al. | |
| 2012/0070264 A1 | 3/2012 | Pape | |
| 2013/0255194 A1 | 10/2013 | Metzger | |

FOREIGN PATENT DOCUMENTS

| | | |
|---|---|---|
| EP | 1123884 A1 | 8/2001 |
| EP | 1696192 | 8/2006 |
| FR | 2650559 A1 | 2/1991 |
| GB | 1459629 A | 12/1976 |
| GB | 2011633 A | 7/1979 |
| JP | H1-33455 | 10/1989 |
| JP | H2-41067 | 3/1990 |

(56) References Cited

FOREIGN PATENT DOCUMENTS

| | | |
|---|---|---|
| JP | 05132007 A | 5/1993 |
| WO | WO0001582 | 1/2000 |
| WO | WO2008/089762 | 7/2008 |

OTHER PUBLICATIONS

Office Action and Search Report issued on Jan. 20, 2014 for related CN Patent Application No. 201180044860.X, in 10 pages.

* cited by examiner

METHOD AND APPARATUS FOR DISTRIBUTING ARTICLES IN A STORAGE COMPARTMENT

FIELD OF THE INVENTION

The present invention concerns a method for distributing articles made by series production in a storage compartment.

The invention furthermore concerns an apparatus for performing the method.

BACKGROUND OF THE INVENTION

The invention has appeared during development of machines for making and delivering bags with loose ice cubes in supermarkets. Such machines are designed with a top part with an ice cube machine and a central packing machine packing the ice cubes loosely in bags, and a lower part with a storage compartment from where the filled ice cube bags are supplied as the customer opens an access door to the storage compartment, providing himself with a desired number of ice cube bags. An example of such a machine is described in the applicant's patent application WO 2008/089762.

In connection with such machines it is a problem that the bags fall down into the storage compartment over the same position. Over time, the stack of bags will form a pyramid. This causes the storage compartment to be badly utilised as it will only be partially filled, resulting in low capacity for a storage compartment of a given size. The storage compartment will rapidly reach a level and thereby a degree of filling where additional bags cannot be produced, before the filling degree is reduced.

The lower capacity of the storage compartment entails that the ice cube machine is to be dimensioned with a relatively high capacity in order to cope with peak loads. These occur e.g. in connection with festivals or by sudden rises in the outdoor temperature because of change in weather.

The problem has hitherto been solved by the staff in the supermarket performing a manual levelling of the ice cube bags in the storage compartment at short intervals. There is a desire to avoid this manual levelling as there are work safety considerations that limit the time in which the employees are allowed to work with frozen products, and a desire to release the employees' resources for other purposes in the supermarket.

The machine will also find application in connection with distribution of other serially produced articles in a storage compartment where distribution of the articles in an even layer is wanted.

OBJECT OF THE INVENTION

It is the object of the invention to indicate a method and an apparatus that ensure an even distribution of articles, in particular bags with ice cubes made in a large number, in a storage compartment, particularly in an ice cube distribution machine in a supermarket.

DESCRIPTION OF THE INVENTION

According to the present invention, this is achieved by a method of the kind mentioned in the introduction which includes the following steps:
A. placing the article on a longitudinally displaceable conveyor above the storage compartment;
B. displacing the article by the conveyor to a discharge area which is selected among at least two discharge areas in the storage compartment;
C. discharging the article by pushing it off over one or the other edge of the conveyor by moving the conveyor over the discharge area;
D. repeating steps A-C with selection of discharge area in a controlled sequence.

The apparatus according to the invention is peculiar in that it includes:
a conveyor with a support surface for an article;
a drive means for longitudinal displacement of the support surface of the conveyor;
at least one pushing off means;
at least one drive means for inserting the at least one pushing off means in the path of the article;
a control means.

By a system according to the present invention, it is possible to achieve an even distribution of articles produced in series in a storage compartment in a simple way.

The system is developed for use in ice cube distribution machines for installation in e.g. supermarkets where the ice cubes are made in situ according to need, and are packed immediately before being put in a storage compartment under the ice cube machine.

The system for levelling can be applied to other types of machines than ice cube distribution machines, where a large number of articles are produced centrally above a storage compartment in which the articles are to be evenly distributed in order to utilise the capacity of the storage compartment. Examples of such applications could be in connection with a plastic injection moulding machine where a large number of articles are produced centrally, or in connection with packing and supplying other types of foods, e.g. vegetables or confectionery.

In the present application, the above mentioned ice cube distribution machine is used as example but this does not exclude other kinds of systems.

The conveyor is provided a support surface upon which the article is placed. This support surface has a horizontal orientation such that the article does not slide off the conveyor by itself, both during its start-up, movement and standstill.

The article is moved by the longitudinal displacement of the conveyor. This longitudinal displacement of the article is performed from an initial position where the article is delivered to the apparatus from the preceding production step to a desired discharge area above the storage compartment. For example, from an initial position under a dispenser unit for packed ice cube bags in an ice cube distribution machine to a discharge area above a position in the discharge space in the lower part of the machine from where the customers pick up the ice cube bags.

The number of discharge areas is determined with regard to the extension of the storage compartment along the displacement direction of the conveyor such that the distribution of articles in the storage compartment becomes even.

In practice, during the development of an ice cube distribution machine with a storage compartment having a length of about 2 m, it has appeared that there is achieved a suitable even distribution of ice cube bags in the storage compartment with four discharge areas.

The conveyor may be of a type where the support surface is formed on a slide which is suspended on an endless conveyor means. The endless conveyor means may e.g. be a chain with a path formed by a number of sprocket wheels. The slide is formed with free edges along open sides transversely to the direction of movement, and suspended along edges which are parallel with the direction of movement. Pushing off is effected over one or the other edge at one or the other side, respectively, which are transverse to the direction of movement.

A pushing off means is introduced in the path of the article. The pushing off means is oriented largely perpendicularly to the direction of movement of the conveyor and stationary during pushing off. Pushing off is effected by longitudinal displacement of the slide and thereby the support surface for the article. The article has no relative movement in relation to the pushing off means, but the article moves relatively to the slide over the edge, finally falling down over the discharge area in the storage compartment under the action of gravity and due to the relative movement between the support surface for the article and the pushing off means.

Pushing off occurs over the edge which is rearmost relative to the direction of movement of the slide.

Alternatively, the conveyor may be of a type where the support surface is formed by an endless conveyor belt. The conveyor belt has free edges along two sides which are parallel with the direction of movement of the conveyor. Pushing off is effected over one or the other edge at one or the other of the sides, respectively, which are parallel with the direction of movement of the conveyor.

A pushing off means is introduced over the conveyor belt in the path of the article. The pushing off means is oblique in relation to the direction of movement of the article and stationary during the pushing off. Pushing off is effected by longitudinal displacing the support surface of the conveyor belt for the article by interaction with the oblique stationary pushing off means, whereby the article is forced over one or the other edge of the conveyor, depending on the direction of the oblique orientation of the pushing off mechanism.

The discharge areas thus lie at each side of the conveyor.

Besides, the conveyor belt may have free edges at its ends. This provides a further discharge area for each free edge.

It applies to both types of conveyors that the conveyor means do not need to be endless. They are just to be arranged such that the direction of movement may be reversed when the support surface of the article reaches an extreme position.

The type of conveyor is chosen with regard to the shape of the storage compartment.

By storage compartments that are narrow in relation to the width, there is chosen a conveyor with free sides and edges transversely to the direction of movement in order to have discharge areas directly under the conveyor, and thereby to achieve discharge areas in one row.

By storage compartments that are wide in relation to the width, there is chosen a conveyor with free sides and edges in parallel with the direction of movement in order to have discharge areas at each side of the conveyor, and thereby to achieve discharge areas in two rows.

The pushing off means may be an arm which may freely be introduced in the path of the article and removed according to need.

Two discharge areas for each pushing off means may be attained, as the drive means for the conveyor may be selected among types with reversing direction of movement, such as electric, hydraulic or pneumatic motors or linear actuators.

An example of such a method according to the invention with one pushing off means and two discharge areas includes the steps:
  A. Placing the article on a longitudinally displaceable conveyor above the storage compartment;
  B. Displacing the article by the conveyor to a first discharge area in the storage compartment;
  C. Discharging the article by pushing it off over one edge of the conveyor by moving the conveyor over the discharge area in a direction away from an initial position, after which the direction of displacement of the conveyor is reversed and it returns to the initial position for repeating the steps, as follows:
  A'. Placing a new article on the longitudinally displaceable conveyor above the storage compartment;
  B'. Displacing the article by the conveyor to a second discharge area in the storage compartment;
  C'. Discharging the article by pushing it off over the other edge of the conveyor by moving the conveyor over the discharge area in a direction against the initial position, after which the conveyor continues back to the initial position for repeating steps A-C or A'-C', depending on the selected sequence.

When the article is discharged over the first discharge area, the pushing off means may be introduced in the path of the article before performing step B, while it before discharging the article over the second discharge area is introduced after performing step B.

In a simple way is hereby achieved that each pushing off means may cover two discharge areas.

The drive means for introducing the pushing off means may be electrically, hydraulically or pneumatically driven and based on a linear or rotating movement, or a combination of the two. Several pushing off means may advantageously be connected with the same drive means such that they are introduced in the path of the article at the same time. This provides a more simple design. The coupled pushing off means are introduced in the path of the article immediately before discharge as one hereby avoids the article being discharged over a wrong discharge area.

The apparatus is provided with a control means connected with the drive means of the apparatus. The control means can be based on an electronic circuit which may possibly be programmable. Alternatively, the control means can be a pure mechanical control which e.g, may be established by a hydraulic or pneumatic circuit.

In a particularly advantageous embodiment of the method according to the invention, this is peculiar in that the sequence for selection of the discharge area of each article is controlled by the steps:
  detecting degree of filling in each discharge area in the storage compartment
  comparing degrees of filling;
  selecting a discharge area on the basis of the said comparison.

The apparatus according to the embodiment of the method is peculiar in that it includes at least one level measuring means which is adapted for detecting the degree of filling in each discharge area in the storage compartment.

In connection with systems where one or more users take articles from the storage compartment, the degree of filling in the discharge areas may be different due to the fact that the articles are taken from the discharge areas at different rates. By actively detecting the degree of filling in the individual discharge areas and adapting the sequence of selecting discharge area on the basis of a comparison of the degrees of filling in each discharge area, there is achieved a levelling that takes account of user interaction.

An example, where a distribution machine has four discharge areas—1, 2, 3, 4—the sequence for selecting discharge area may be as follows:
  Filling degree for all discharge areas <100%
    Discharge over the discharge areas in a uniform sequence, one by one, e.g. 1, 2, 3, 4, 1, 2, 3, 4, 1, etc.

Filling degree of a discharge area (e.g. area 1)=100%, remaining areas <100%
  Discharge over the discharge areas in a sequence that excludes the filled area, e.g. 2, 3, 4, 2, 3, 4, 2, etc.
Filling degree of several discharge areas (e.g. area 1, 4)=100%, remaining areas <100%
  Discharge over the discharge areas in a sequence that excludes the filled areas, e.g. 2, 3, 2, 3, 2, etc.
Filling degree of several discharge areas (e.g. area 1, 2, 4)=100%, remaining area <100%
  Discharge over the discharge areas in a sequence that excludes the filled areas, e.g. 3, 3, 3, etc.
Filling degree of all discharge areas=100%
  The system for levelling is stopped and discharge is suspended until the degree of filling in the discharge areas reach a low value.

Monitoring the filling degree may furthermore be utilised for controlling the production of articles.

For example, the said ice cube distribution machine may be provided with two ice cube dispensers that deliver ice cubes to a common packing unit. When the filling degree in half of the discharge areas reach 100%, it may be decided to close one ice cube dispenser and thereby control the production such that optimal efficiency and minimal idling time is achieved for the units in the production machinery.

Hereby is achieved less energy consumption and longer service life for the whole distribution machine including production machinery.

In a particularly advantageous embodiment of the method according to the invention, this is peculiar in that the conveyor is elevated to a first height while performing step A, and that the conveyor is lowered to a second height before performing step B.

The apparatus according to the embodiment of the invention is peculiar in that it includes
  a drive means for vertical displacement of the support surface of the conveyor.

This embodiment of the method and the apparatus is particularly advantageous in connection with systems of a type known from the applicant's patent application WO 2008/089762 where the ice cubes are packed in film bags that are closed by welding while using welding jaws.

During filling of a film bag, this typically hangs freely in the machine such that it is possible to fill the film bag to a given weight which is measured by a weighing cell. Then the conveyor is lifted to a first height, whereby support of the film bag, which is the article, is gradually taken over by the conveyor until the former is fully supported on the support face of the conveyor. The film web is now fully relieved and not influenced by tensile forces induced by the weight of the filled film bag. Hereby is achieved a better welding as severing the film web by melting before establishing the necessary weld seams is avoided. A loaded film web will rapidly be deformed in direction of the tensile forces when melting under the action of the welding jaws such that the film bag is inadvertently released from the film web.

The conveyor has drive means for the vertical displacement. This drive means may include a linear actuator in the form of a hydraulic or pneumatic cylinder connected with the suspension points of the conveyor, a parallelogram or a guide for guiding the conveyor during the vertical displacement.

In an embodiment of the invention, wherein the conveyor includes a slide connected with an endless conveyor means in the form of a chain provided with a path formed by a number of sprocket wheels, the path is arranged such that by means of sprocket wheels at different levels and distances it provides the slide with a path where it may be displaced in height by passing the initial position for placing the articles, and be displaced in longitudinal direction towards the discharge positions.

In a particularly simple way there is hereby achieved the ability of combining longitudinal displaceability with vertical displaceability of the conveyor by means of the same construction element in the apparatus. The same drive means is used for longitudinal displacement and vertical displacement.

DESCRIPTION OF THE DRAWING

The invention will be explained in more detail below with reference to the accompanying drawing, where.

In the explanation of the Figures, identical or corresponding elements will be provided with the same designations in different Figures. Therefore, no explanation of all details will be given in connection with each single FIGURE/embodiment.

DETAILED DESCRIPTION OF THE INVENTION

Figure 1:
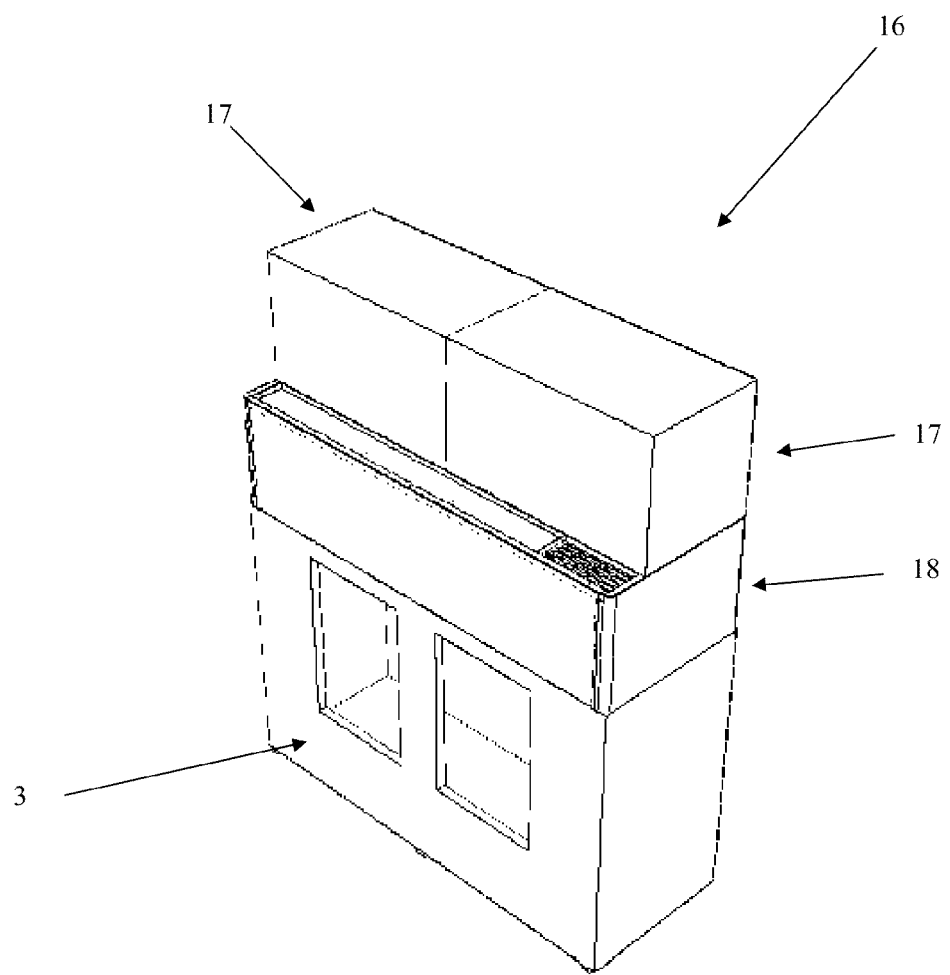
FIG. 1 shows an isometric view of an ice cube distribution machine.

FIG. 1 shows an isometric view of an ice cube distribution machine 16. The machine 16 is shown as example of an application of the method and the apparatus 1 (see FIG. 2) which are objects of the present application.

The machine 16 includes a top part with two ice cube machines 17 and a centrally disposed packing machine 18 and a bottom part with a storage compartment 3.

The ice cube machines 17 supply ice cubes down into film bags which are closed in the packing machine 18. A filled and closed film bag is termed an article 2 (see FIG. 2) in the present application. The apparatus 1 (see FIG. 2) for distributing articles 2 (see FIG. 2) is disposed under the packing machine 18.

Figure 2:
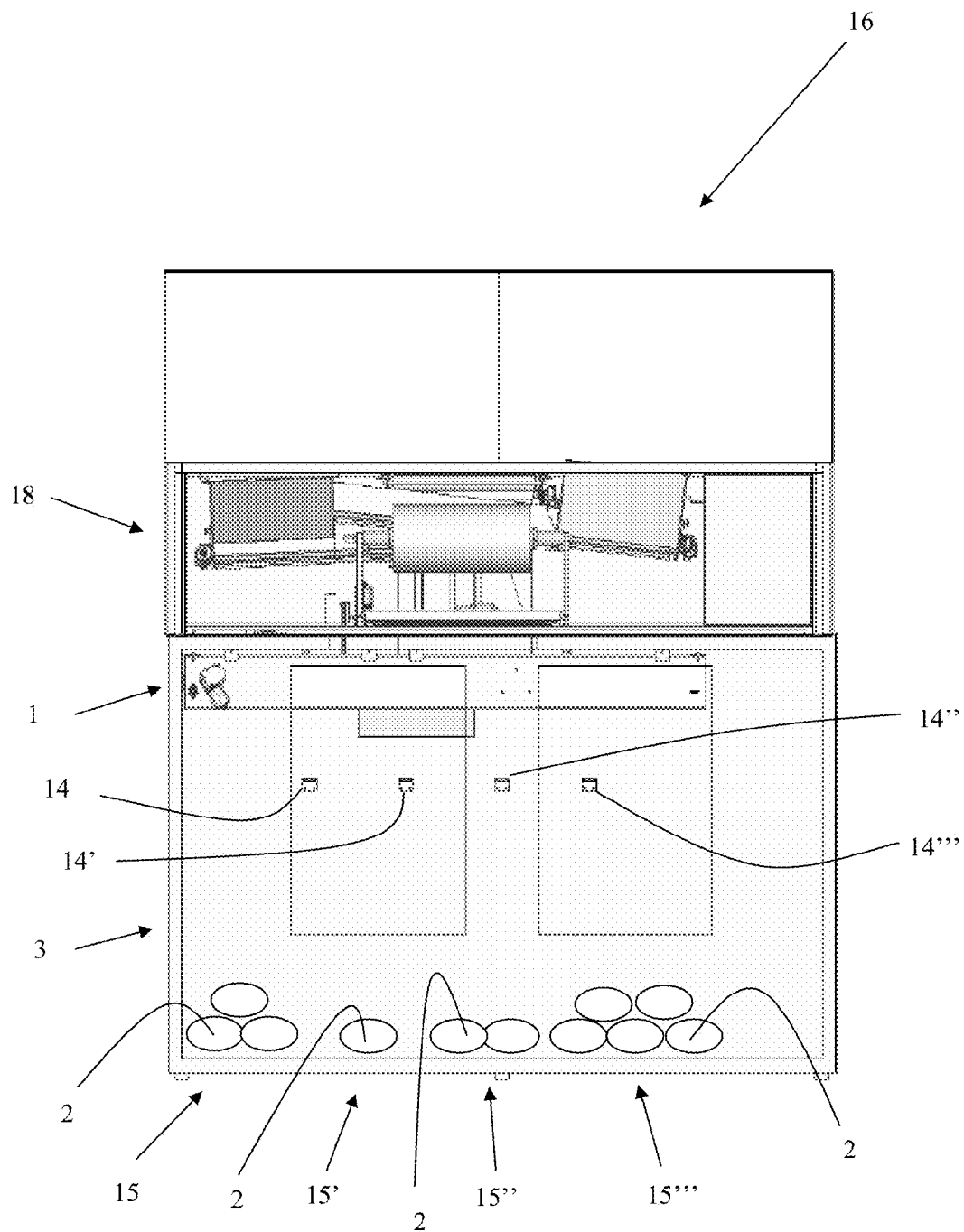
FIG. 2 shows a side view of an ice cube distribution machine.

FIG. 2 shows a side view of the machine 16 where the front side of the packing machine 18 and the storage compartment 3 are open so that one may see into the machine 16.

The apparatus 1 is suspended under the packing machine 18 which is a dispenser of the articles 2 (see FIG. 2).

The storage compartment 3 in the shown embodiment of the apparatus has four discharge areas 15, 15', 15", 15'". When the articles are discharged over the discharge areas 15, 15', 15", 15'" in a uniform sequence, a satisfactory levelling of the articles 2 (see FIG. 2) in the storage compartment 3 is achieved.

The degree of filling of the individual discharge areas 15, 15', 15", 15'" is detected by a level measuring means 14, 14', 14", 14'" for each discharge area 15, 15', 15", 15'". In the shown embodiment, the level measuring means 14, 14', 14", 14'" are disposed higher than the uppermost level of the articles 2 in the storage compartment 3. The risk of damage to the level measuring means 14, 14', 14", 14'" due to contact with the articles 2 is thereby minimised.

On FIG. 2, the articles 2 in the storage compartment 3 are shown at a low filling degree. There are a different number of articles 2 on the different discharge areas 15, 15', 15", 15'". The reason for this may be that the customers primarily have taken articles 2 out from the discharge areas 15' and 15". By comparing the filling degrees in the discharge areas 15, 15', 15", 15'" based on measurements performed by the level measuring means 14, 14', 14", 14'", the control means (not shown) of the machine will prioritise filling discharge area 15' until it has the same degree of filling as discharge area 15". The two discharge areas 15' and 15" are then filled until they have the same filling degree as discharge area 15. After which the three discharge areas 15, 15' and 15" are prioritised until all discharge areas 15, 15', 15", 15'" are provided the same degree of filling. The apparatus 1 will then distribute the articles 2 over the discharge areas 15, 15', 15", 15'" in a uniform sequence until the filling degree is 100% for all discharge areas 15, 15', 15", 15'" in the storage compartment 3.

Figure 3:
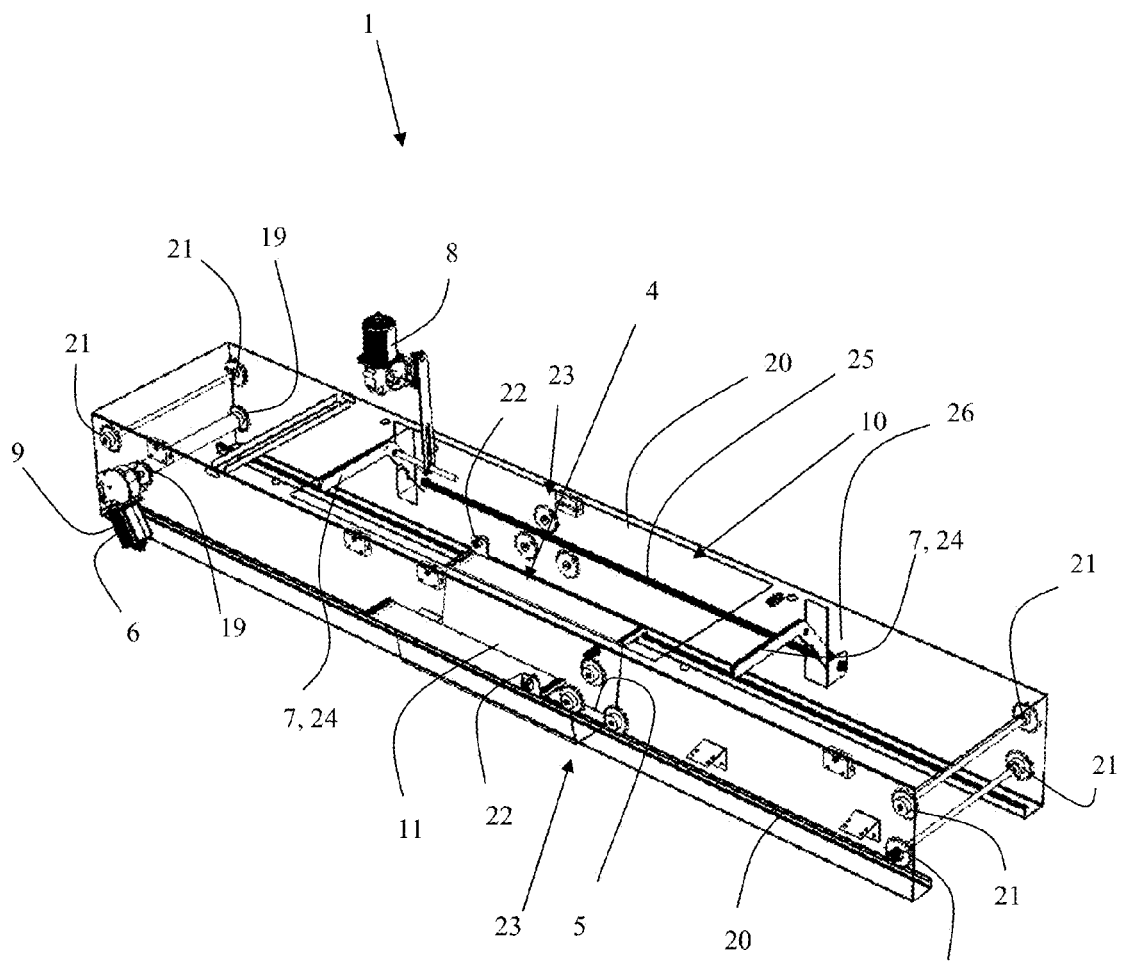
FIG. 3 shows a first isometric view of an apparatus for distributing articles.
Figure 4:
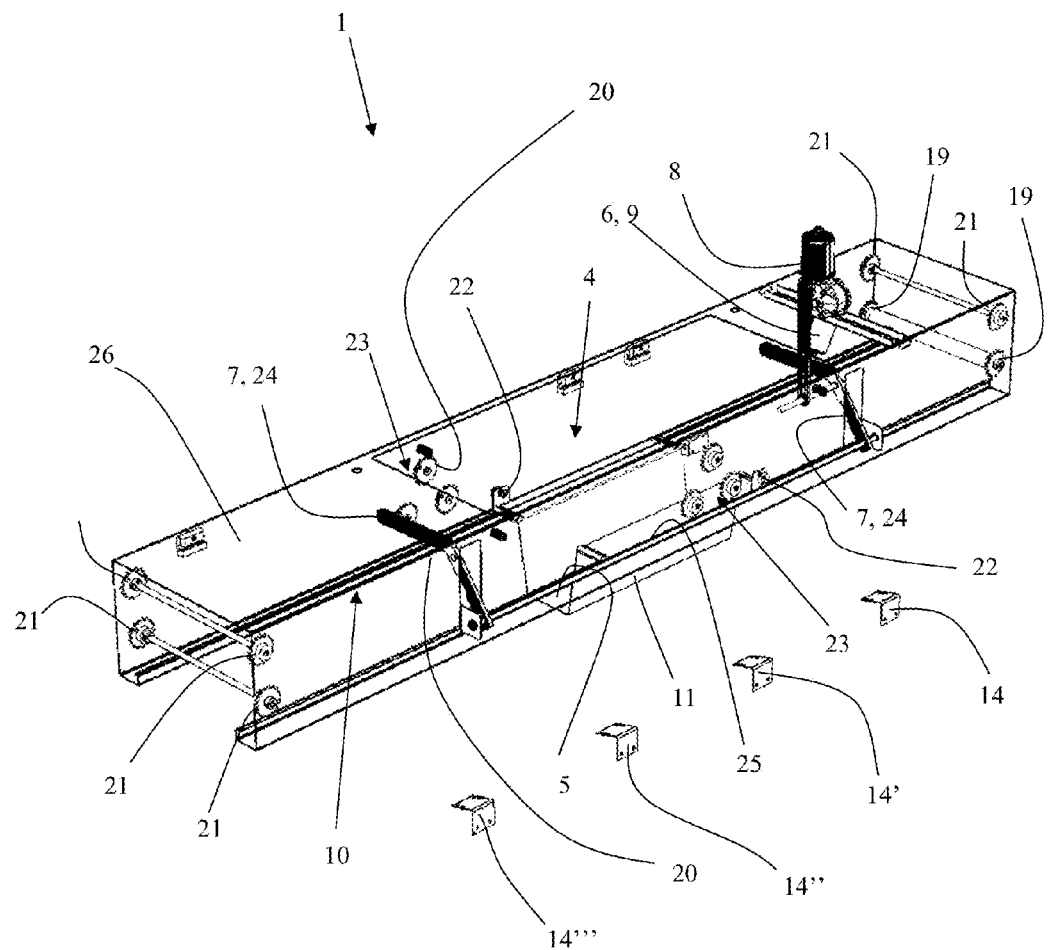
FIG. 4 shows a second isometric view of an apparatus for distributing articles.

FIGS. 3 and 4 show isometric views of the apparatus 1 from two different angles.

Figure 5:
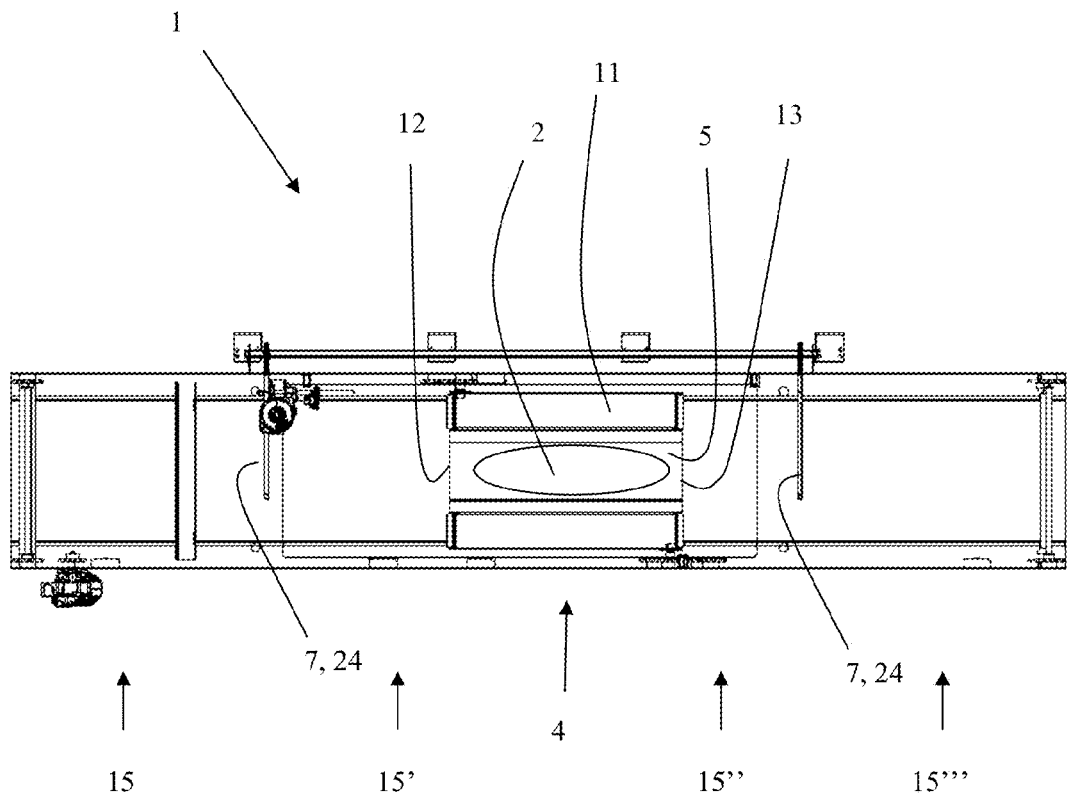
FIG. 5 shows a view of an apparatus for distributing articles, as seen from above and with the conveyor at an initial position with an article on the support surface.

The apparatus 1 has a conveyor 4 with a support surface 5 for an article 2 (see FIG. 5). The conveyor 4 is longitudinally displaceable so that it may distribute articles 2 (see FIG. 2) over the discharge areas 15, 15', 15", 15'" (see FIG. 2).

A drive means for longitudinal displacement 6 of the support surface 5 of the conveyor is connected with a set of driving sprocket wheels 19. In the shown embodiment, the support surface 5 of the conveyor is disposed on a slide 11. The slide has two open sides transversely to the direction of movement with free edges 12, 13 (see FIG. 5). An article 2 will leave the slide 11 over these free edges 12, 13. The slide 11 has a U-shaped cross-section, but other cross-sections may also be used. The advantage of the U-shaped cross-section is that the articles 2 only can leave the slide over the edges at each end.

The conveyor 4 includes an endless conveyor means 10 in the form of a chain 20 at each side of the slide 11 which runs around a number of other sprocket wheels 21. The slide 11 is fastened at each side to a chain link by an adapter 22. The two chain links are disposed diagonally opposite each other. The endless conveyor means 10 both indicates a guide for the slide 11 and a connection between the drive means for longitudinal displacement 6 and the support surface 5, and thereby the slide 11.

The conveyor 4 is vertically displaceable as the chain 20 runs around three middle sprocket wheels 23 at each side. The slide 11 is elevated from a second height to a first height during passage of the three middle sprocket wheels 23. This function is used in connection with welding film bags where the support surface 5 is elevated such that an article 2 is fully supported and the film web relieved thereby, such that cutting off a film bag is avoided during welding. In the shown embodiment, the drive means for longitudinal displacement 6 coincides with the drive means for vertical displacement 9 of the support surface 5 of the conveyor.

The conveyor 4 furthermore includes a pushing off means 7 which in the shown embodiment is an arm 24 which by rotating about a shaft 25 connected with a drive means for inserting 8 the pushing off means 7 can be inserted in the path of the article. The pushing off means 7 is oriented perpendicularly to the direction of movement of the conveyor and thereby that of the slide.

In the shown embodiment, the conveyor 4 has two pushing off means 7—one at each side of the centre of the apparatus. Both arms 24 are connected to the same shaft 25 such that they both pivot down by activating the drive means for inserting 8 the pushing off means 7.

The conveyor 4 is surrounded by a frame 26 on which the above components are attached.

Outside the frame 26 are provided level measuring means 14 in a number corresponding to the number of discharge areas. In a preferred embodiment of the invention, there are four level measuring means 14, 14', 14", 14'".

FIGS. 5-13 show different sequences as seen from above during performance of the method according to the invention. Sequences for discharge on discharge areas 15" and 15'" are shown (see FIG. 2). From that the skilled in the art may derive discharging over the remaining discharge areas.

On FIG. 5, an article 2 is disposed on the support surface 5 of the conveyor on the slide 11. This is an initial position for the method. The slide 11 is at its first height. This is step A of the method.

Figure 6:
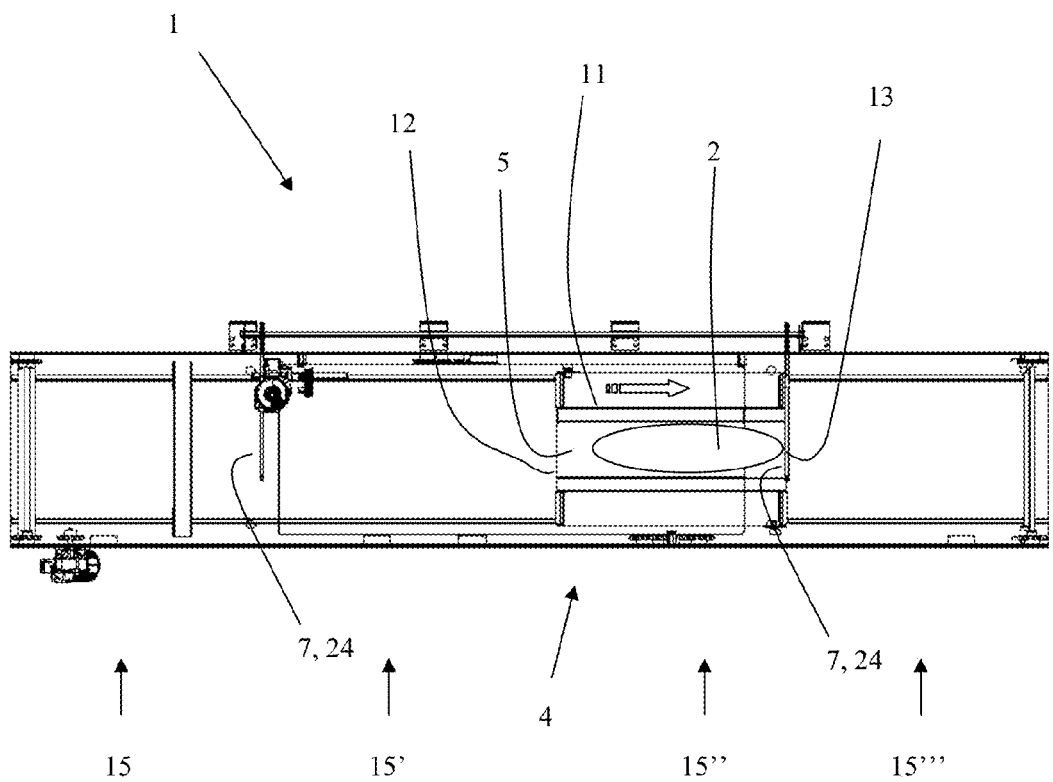
FIG. 6 shows a view of the apparatus, as seen from above and with the conveyor at a position on its way to discharge the article in a first discharge area.

FIG. 6 shows the slide 11 with the article over the discharge area 15". The pushing off means 7, which is an arm 24, is inserted in the path of the article. The article 2 has just contact with the arm 24. This is step B of the method.

Figure 7:
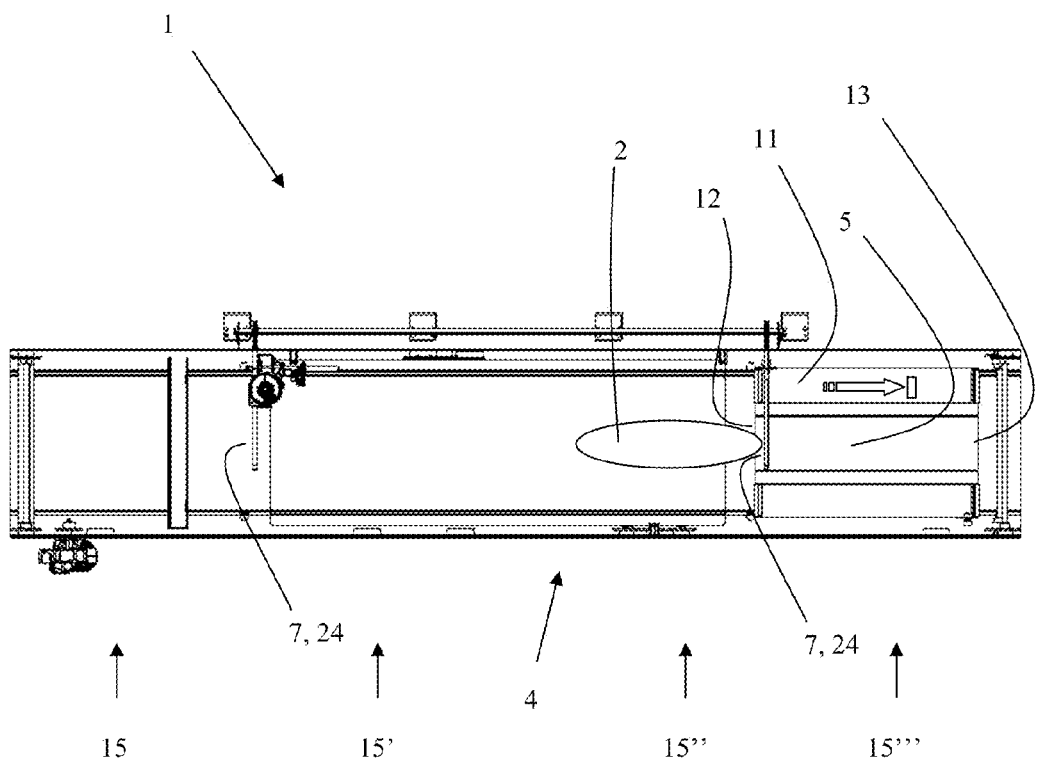
FIG. 7 shows a view of the apparatus, as seen from above and with the conveyor at a position during discharge of the article in a first discharge area.

On FIG. 7, the displacement of the slide 11 is continued. The article 2 which is retained by the arm 24 is discharged over one edge 12 of the slide in the discharge area 15". This is step C of the method.

Figure 8:
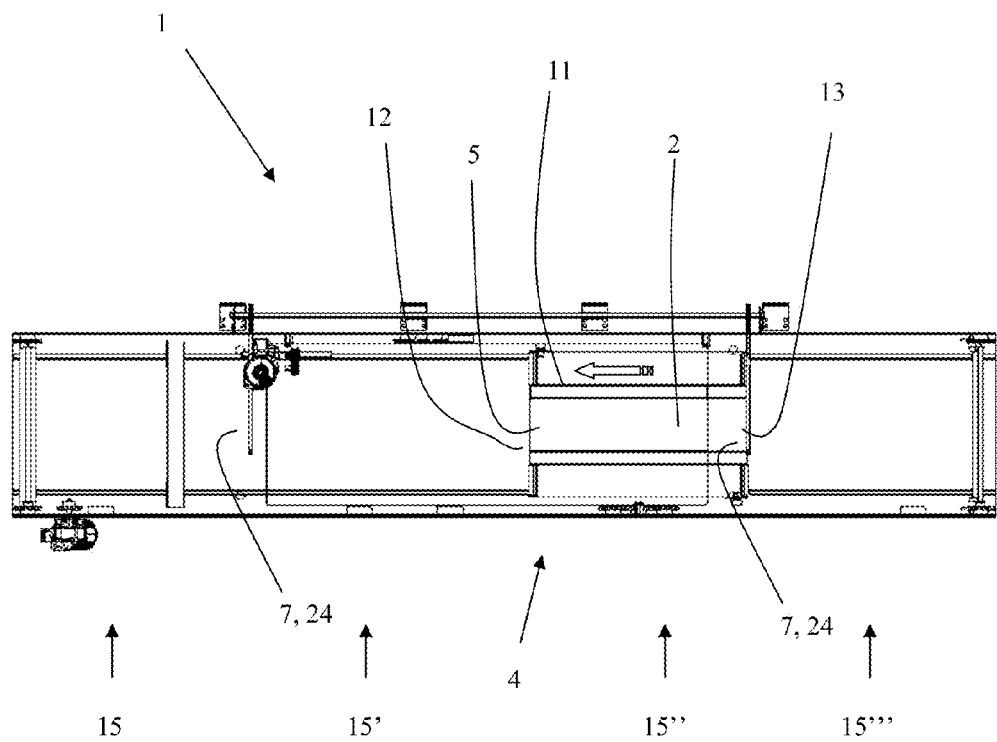
FIG. 8 shows a view of the apparatus, as seen from above and with the conveyor at a position on its way to the initial position.

On FIG. 8, the empty slide 11 is on its way back to the initial position for collecting a further article 2. This is preparation to step D of the method which is a repetition of steps A-C with selection of discharge area 15, 15', 15", 15'" among the accessible discharge areas in a controlled sequence.

Figure 9:
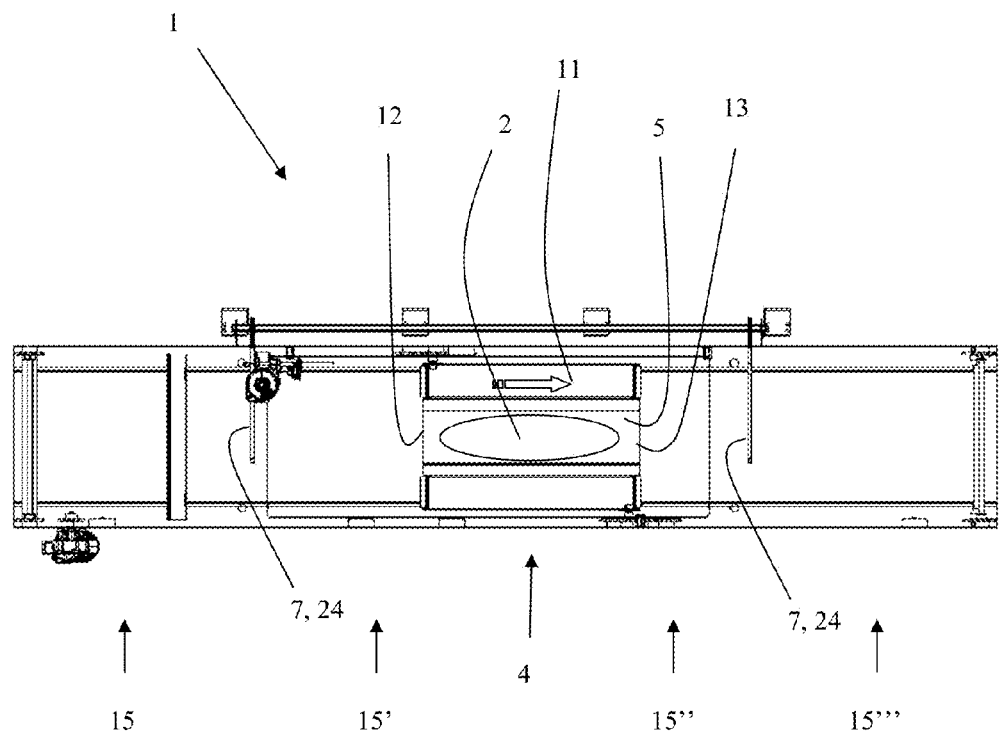
FIG. 9 shows a view of the apparatus, as seen from above and with the conveyor at an initial position with an article on the support surface on its way to a second discharge area.

FIG. 9 shows the slide 11 with an article 2 where the slide is on its way to discharge area 15'". This is during performance of step B of the method. The pushing off means 7, which is the arm 24, is in a position where it is outside the path of the article.

Figure 10:
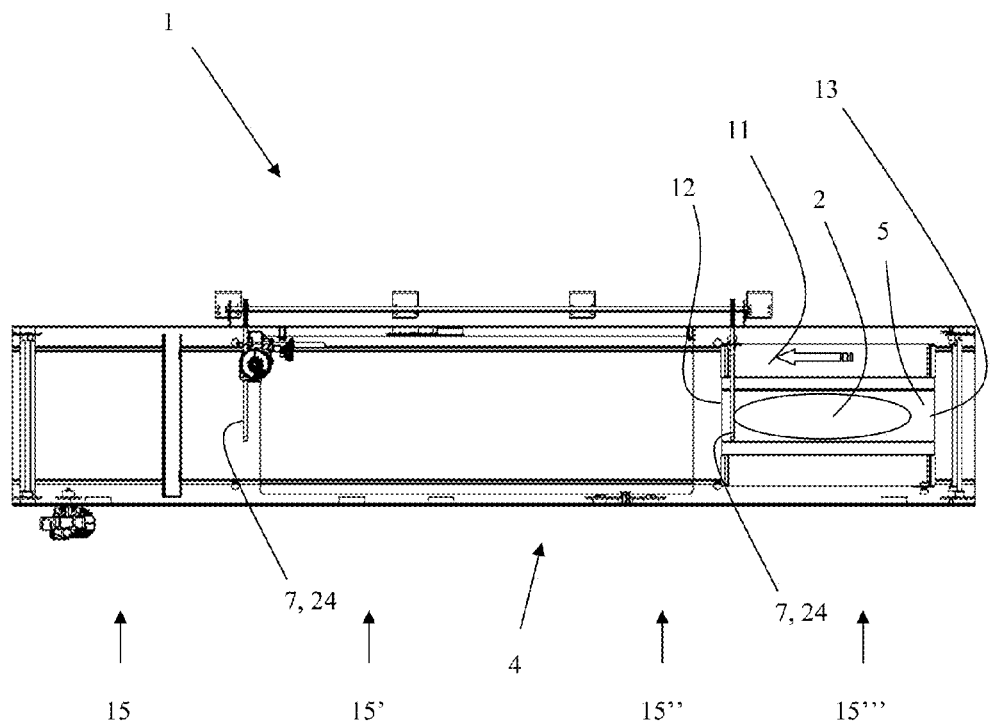
FIG. 10 shows a view of the apparatus, as seen from above and with the conveyor at a position on its way to discharge the article in the second discharge area.

FIG. 10 shows the slide 11 with the article 2 over the discharge area 15'". The arm 24 is introduced in the path of the article. The article 2 has just contact with the arm 24. The conveyor 4 changes direction of displacement. This is the end of step B of the method.

Figure 11:
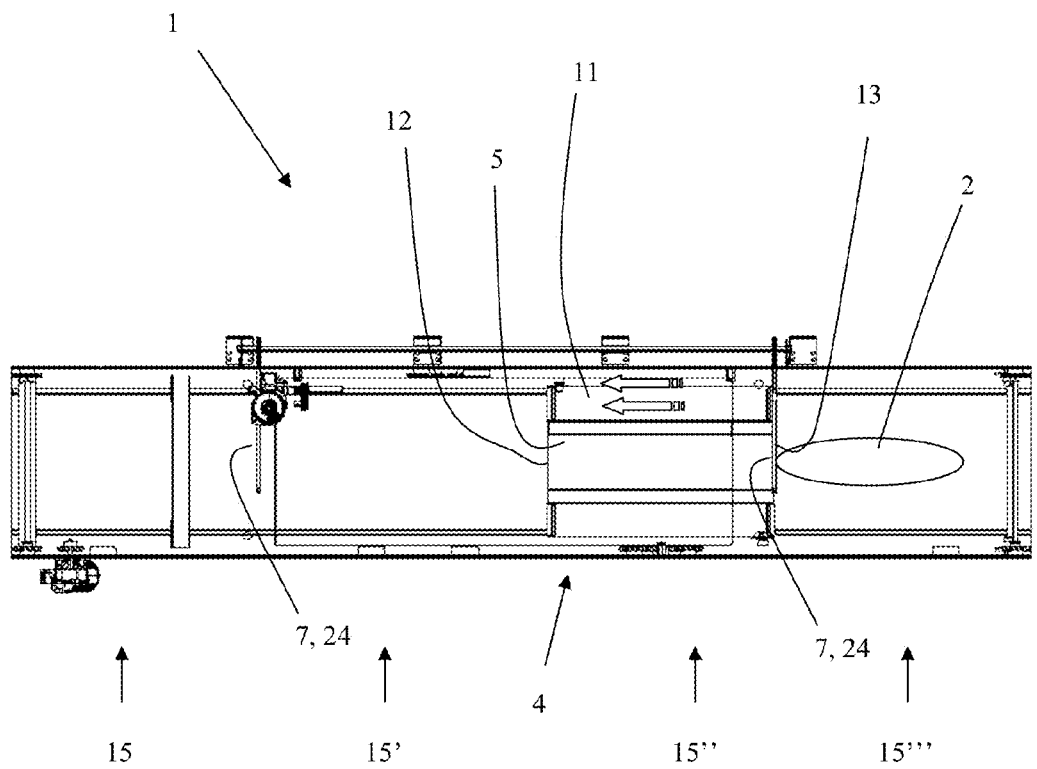
FIG. 11 shows a view of the apparatus, as seen from above and with the conveyor at a position on its way to the initial position and after discharging the article in the second discharge area.

On FIG. 11, the displacement with the changed direction is continued. The article 2, which is retained by the arm 24, though on another side of the latter in relation to discharge over the discharge area 15" as on FIG. 7, is discharged over the other edge 13 of the slide in the discharge area 15'". This is step C of the method.

The slide 11 then continues longitudinal displacement towards the initial position for repeating the method.

Figure 12:
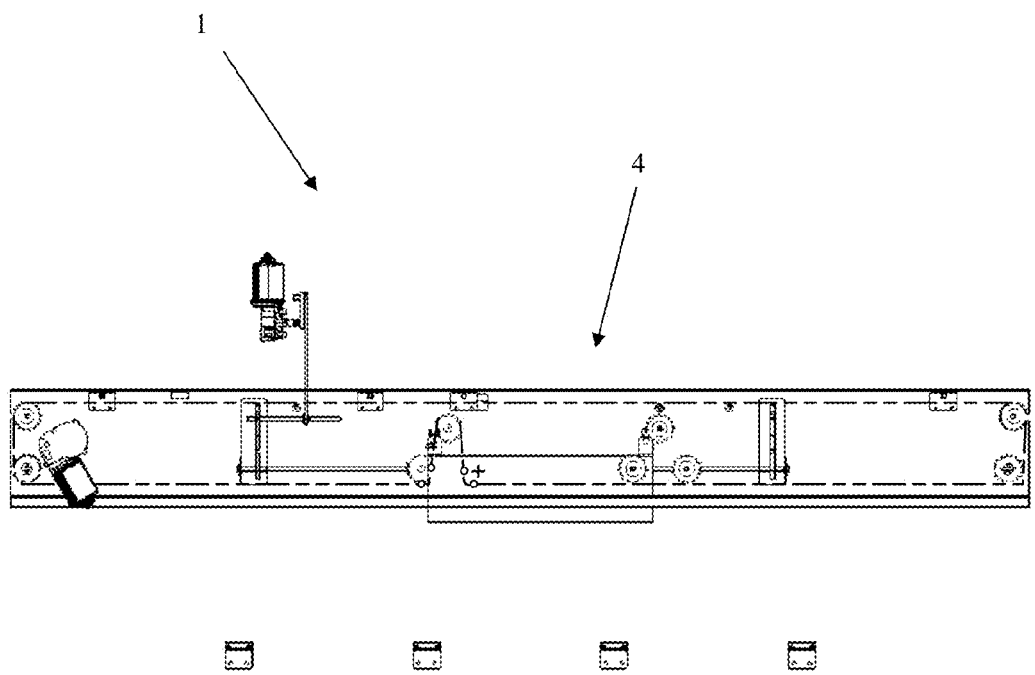
FIG. 12 shows a side view of the apparatus with the conveyor at a first height.

FIG. 12 shows the apparatus 1 with the conveyor 4 lifted to a first height where a film bag is supported for welding.

Figure 13:
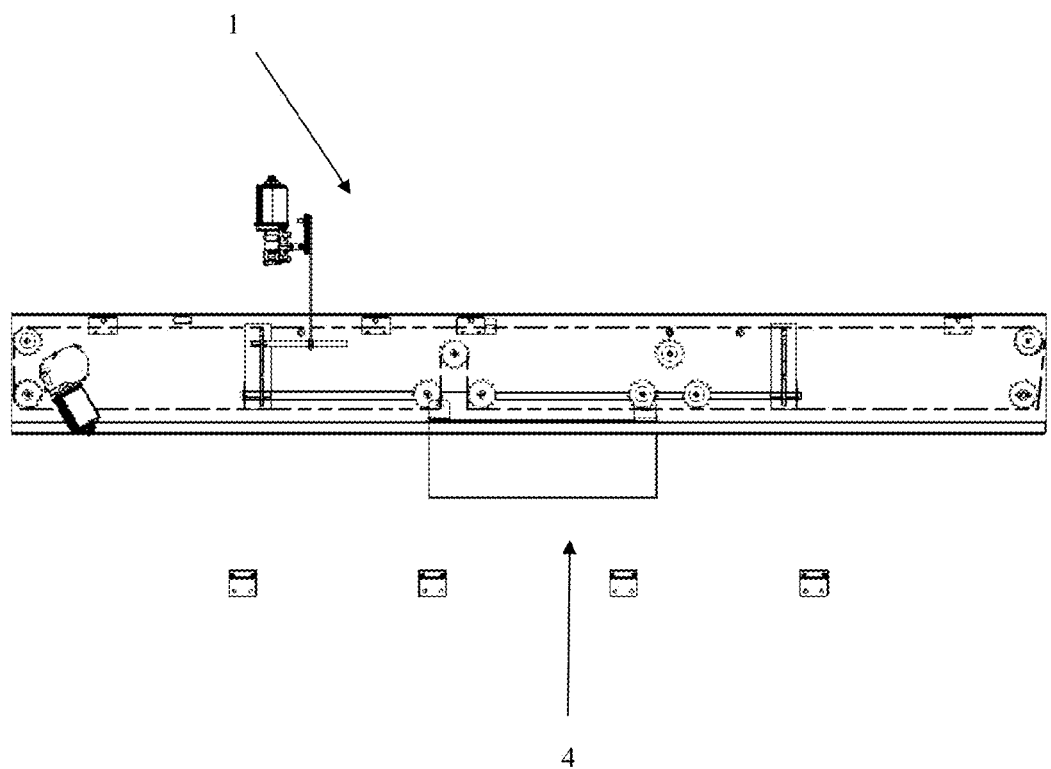
FIG. 13 shows a side view of the apparatus with the conveyor at a second height.

FIG. 13 shows the apparatus 1 with the conveyor 4 lowered to a second height after cutting off the article 2.

Figure 14:
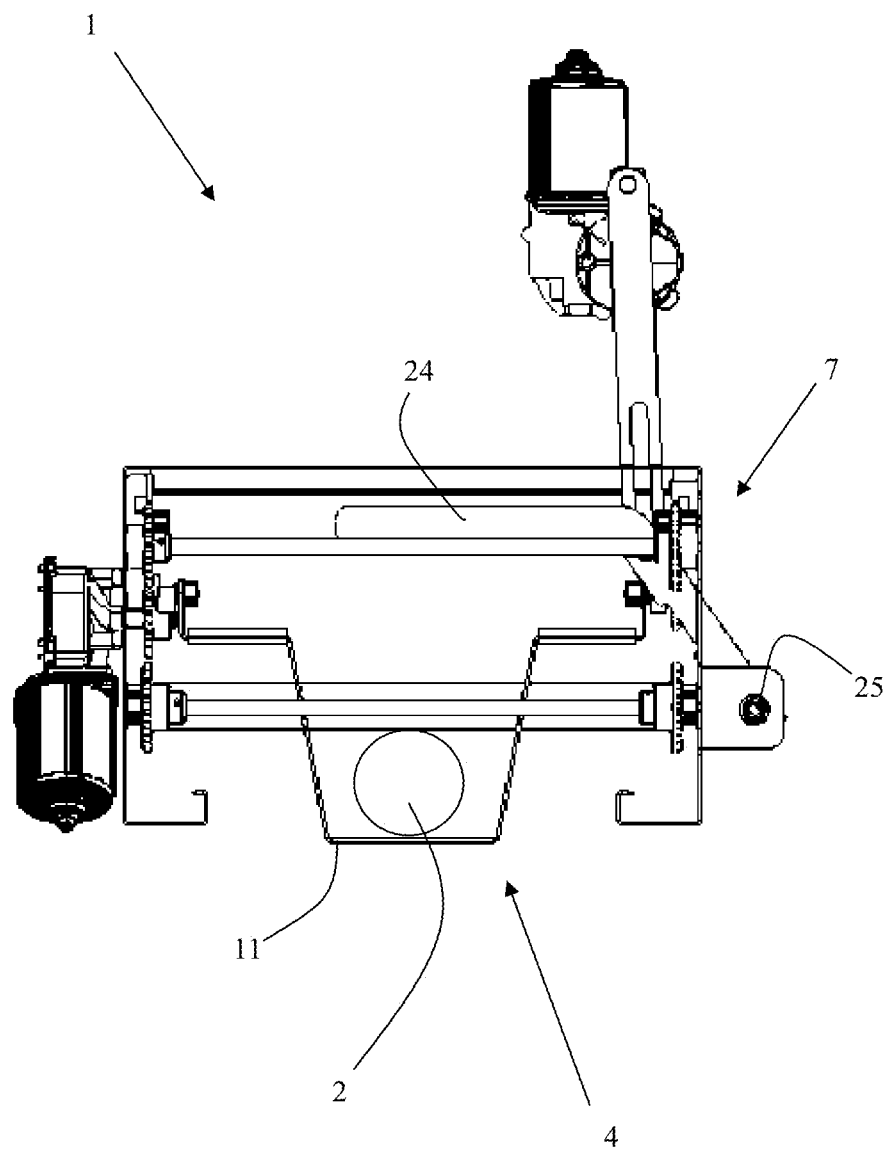
FIG. 14 shows a second side view of the apparatus with the pushing off means at a position outside the path of the article.
Figure 15:
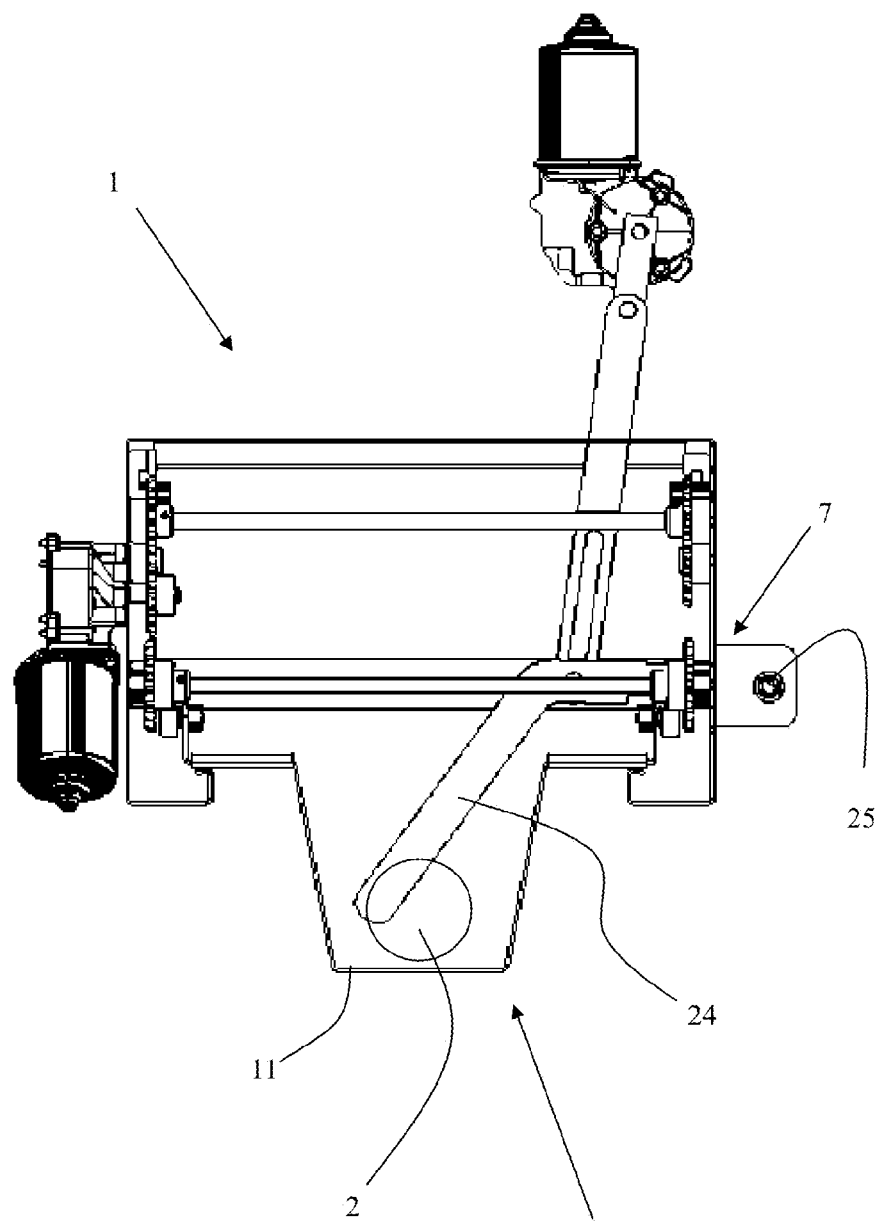
FIG. 15 shows a second side view of the apparatus with the pushing off means at a position within the path of the article.

FIGS. 14-15 show the apparatus 1 with the conveyor 4 which here comprises a slide 11 and the pushing off means 7, which here is an arm 24 which by rotation about a shaft 25 can be inserted in the path of the article.

On FIG. 14, the arm is at a position outside the path of the article, while on FIG. 15 it is at a position within the path of the article where pushing off occurs by the continued displacing of the slide past the arm 24 in one and the other longitudinal direction, respectively, depending on which side out of the plane relative to FIG. 15 discharge is desired.

Figure 16:
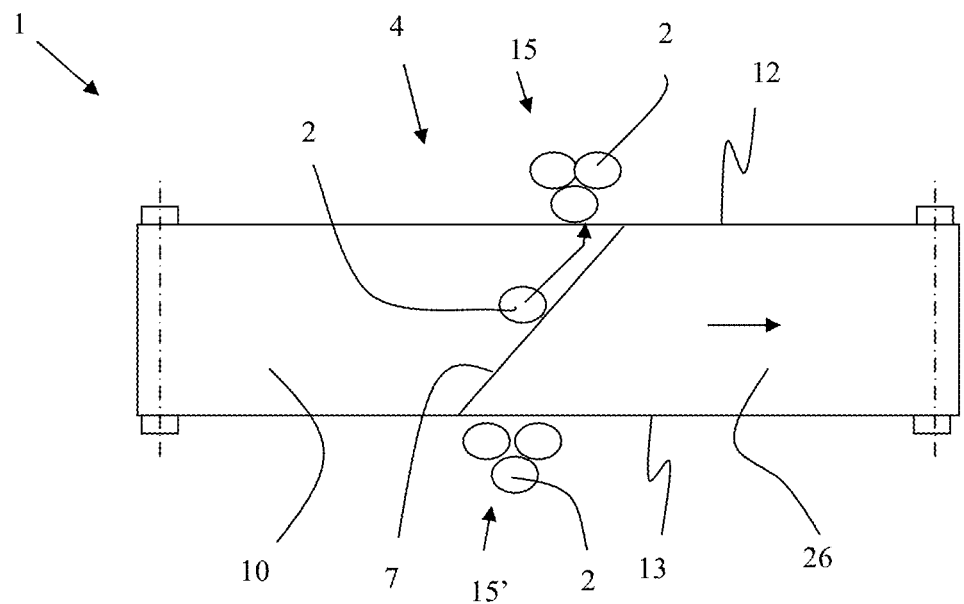
FIG. 16 illustrates a top plan view of a second embodiment of a dispensing conveyor apparatus in which articles are dispensed from opposite sides of a conveyor.

FIG. 16 shows an alternative embodiment of the apparatus 1 where the conveyor 4 includes an endless conveyor means 10 in the form of a conveyor belt 26 having free edges 12, 13 in parallel with the direction of movement of the conveyor. The pushing off means 7 is oblique relative to the direction of movement of the conveyor. In the shown embodiment, the apparatus 1 has two discharge areas 15, 15'. These may be served by means of one pushing off means 7.

The article 2 will be pushed over one 12 and the other 13, respectively, free edge of the conveyor belt, depending on its direction of movement, as the article 2 is acted on by an oblique resulting force due to the oblique orientation of the pushing off means 7.

This embodiment of the invention enables use of only one apparatus in even relatively wide storage compartments as the discharge areas are laid out in two rows, one at each side of the conveyor 4.

The invention claimed is:

1. A method comprising:
   distributing ice-filled bags within an internal region defined by a temperature-controlled storage unit until a desired level of filling is reached;
   providing an access door to the storage unit for allowing customers to remove one or more ice-filled bags from the internal region during or after filling of the internal region to the desired level of filling;
   the step of distributing ice-filled bags comprising:
   providing a first kicker assembly comprising a first basket;
   disposing the first ice-filled bag in the first basket of the first kicker assembly;
   searching a plurality of bag discharge areas within the internal region for a first available space in which to dispose the first ice-filled bag, the step of searching comprising monitoring fill levels in the bag discharge areas within the internal region using level measuring devices within the internal region to identify bag discharge areas with available space for receiving an ice-filled bag, whereby the searching takes into account customer removal of ice-filled bags from the internal region; and
   disposing the first ice-filled bag in the first available space in the internal region, comprising:
   discharging the first ice-filled bag from the first kicker assembly.

2. The method of claim 1 further comprising:
   determining whether the temperature-controlled storage unit is full of bags filled with ice after distributing the first ice-filled bag within the internal region defined by the temperature-controlled storage unit by monitoring with the level measuring devices to determine if all bag discharge areas are at the desired level of filling with bags of ice; and
   if the temperature-controlled storage unit is not full of bags filled with ice after distributing the first ice-filled bag within the internal region defined by the temperature-controlled storage unit, then:
   (a) filling another bag with ice to thereby produce a successive ice-filled bag;
   (b) searching for an available space in the internal region in which to dispose the successive ice-filled bag by monitoring of fill levels in the bag discharge areas using the level measuring devices to locate a bag discharge area with available space;
   (c) distributing the successive ice-filled bag in the located available space within the internal region defined by the temperature-controlled storage unit; and
   (d) if the temperature-controlled storage unit is not at the desired degree of filling with bags filled with ice after distributing the successive ice-filled bag within the internal region defined by the temperature-controlled storage unit, then repeating steps (a) to (c) until the temperature-controlled storage unit reaches the desired degree of filling with bags filled with ice.

3. The method of claim 1, further comprising repeating the same steps to distribute successive ice-filled bags in further available space in the internal region until the desired level of filling is reached, and continuing to monitor the fill levels in the bag discharge areas after the storage unit is at the desired level of filling to identify bag discharge areas with available space due to customer removal of ice-filled bags from the bag discharge areas.

4. The method of claim 1, further comprising:
   positioning the first basket in a start position for receiving ice-filled bags from a dispenser above the bag discharge areas
   driving the support first basket to a selected first discharge position in which the first basket is located at a discharge position for discharging a bag into the bag discharge area having the first available space;
   the step of discharging the first ice-filled bag from the first kicker assembly comprising transporting the first ice-filled bag off the first basket to drop into the first available space;
   driving the first basket back to the start position; and
   repeating the foregoing steps to drive the first basket to selected discharge positions and discharge ice-filled bags into successive selected bag discharge areas with available space in the internal region.

5. The method of claim 4, wherein the first basket has at least a first free edge and the step of transporting the first ice-filled bag off the first basket comprises conveying it over the first free edge.

6. The method of claim 5, wherein the first basket has opposite first and second free edges and some of the ice-filled bags are discharged over a first edge of the first basket and other ice-filled bags are discharged over a second edge of the first basket.

7. The method of claim 4, wherein the first basket comprises a slide platform having opposite free edges and the step of conveying the first ice-filled bag off the first basket comprises pushing the first ice-filled bag off the platform and over a selected free edge with a pusher device.

8. The method of claim 4, further comprising periodically detecting the degree of filling in each bag discharge area, comparing the degrees of filling, and selecting successive bag discharge areas into which ice-filled bags are successively discharged based on the available storage space in each bag discharge area so as to produce leveling of the stacks of ice-filled bags in adjacent bag discharge areas.

9. The method of claim 8, wherein discharge into the bag discharge areas follows a predetermined sequence including all bag discharge areas when the detected degree of filling in all bag discharge areas is less than a predetermined degree of filling.

10. The method of claim 9, wherein discharge of ice-filled bags when one or more bag discharge areas are at the predetermined degree of filling follows a predetermined sequence of discharging ice-filled bags into successive selected bag discharge areas which are detected to have a degree of filling less than the predetermined degree of filling.

11. The method of claim 10, wherein dispensing of ice-filled bags onto the first basket is suspended when the filling degree in all bag discharge areas is at the predetermined degree of filling and is re-started when the filling degree reaches a predetermined value less than the predetermined degree of filling.

12. The method of claim 4, wherein the first basket is associated with a conveyor unit and the step of driving the support first basket comprises driving the first basket along a conveyor path to the selected discharge position, the conveyor unit being configured to define discharge positions corresponding to each bag discharge area in the internal region.

13. The method of claim 12, wherein the conveyor path is a longitudinal path and the first basket is driven back and forth in a longitudinal path above the storage area.

14. A bagged ice storage and dispensing system comprising:
a temperature-controlled storage unit having an internal region for storage and dispensing of bags containing ice, the internal region having a plurality of bag discharge areas for receiving bags;
the storage unit having an access door allowing access to the internal region for customer retrieval of one or more bags containing ice from the storage unit;
a distributor comprising a first kicker assembly having a basket, the distributor being configured to distribute ice-filled bags within the internal region of the temperature-controlled storage unit;
a dispenser unit which is configured to supply ice-filled bags to the basket of the first kicker assembly;
a plurality of level measuring devices configured to monitor fill levels in a plurality of bag discharge areas within the internal region to identify one or more bag discharge areas with available space in the internal region in which to discharge ice-filled bags; and
the distributor further comprising a discharge device configured to discharge ice-containing bags from the first kicker assembly in selected discharge areas in the internal region identified as having available space.

15. The system of claim 14,
wherein the distributor comprises a conveyor located above the internal region in the storage unit and including the first kicker assembly, the conveyor configured to drive the basket back and forth along a conveyor path above the discharge areas between a start position to receive an ice-filled bag from the dispenser unit and a plurality of different discharge positions corresponding to different bag discharge areas in the internal region;
a controller is associated with the conveyor and discharge device and configured to actuate the conveyor to drive the basket back and forth from the start position to selected discharge positions corresponding to successive selected discharge areas on receipt of successive ice-filled bags onto the basket and to activate the discharge device to drive each ice-filled bag off the basket into the respective storage position on arrival at the selected discharge position;
the level measuring devices associated with the respective discharge areas having outputs in communication with the controller; and
the controller being configured to monitor the outputs of the level measuring devices during and after customer removal of ice-filled bags from the internal region and to control the conveyor to drive the basket into discharge positions corresponding to selected discharge areas which have available space.

16. The system of claim 15, wherein the basket comprises a platform configured to support a single ice-filled bag during transport, the platform having at least one free edge, and the discharge device is configured to drive ice-filled bags off at least said one free edge into different discharge areas.

17. The system of claim 16, wherein the platform has opposite first and second free edges and the discharge device is configured to selectively drive ice-filled bags off the first or second free edges into different discharge areas.

18. The system of claim 16, wherein the discharge device comprises at least one pusher device movable between an extended position in the path of an ice-filled bag on the platform as the platform is driven along the longitudinal drive path and a retracted position out of the path of an ice-filled bag, the pusher device in the extended position being configured to engage the ice-filled bag to push it off the platform in a direction opposite to the drive direction of the platform.

19. The system of claim 18, wherein the discharge device comprises a pair of spaced pusher devices.

20. The system of claim 15, wherein the internal region has at least four different discharge areas for receiving stacked ice-filled bags.

* * * * *